(12) United States Patent
Sugawara

(10) Patent No.: US 6,601,957 B2
(45) Date of Patent: Aug. 5, 2003

(54) PROJECTION-TYPE IMAGE DISPLAYING DEVICE

(75) Inventor: Saburo Sugawara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/068,546

(22) Filed: Feb. 5, 2002

(65) Prior Publication Data

US 2002/0113949 A1 Aug. 22, 2002

(30) Foreign Application Priority Data

Feb. 6, 2001 (JP) ........................... 2001/030135

(51) Int. Cl.[7] .................... G03B 21/00; G03B 21/14; G03B 21/26; G03B 21/28; G02F 1/1335
(52) U.S. Cl. ........................ 353/31; 353/20; 353/33; 353/34; 353/37; 353/81; 353/82; 353/122; 349/5; 349/7; 349/8; 349/9
(58) Field of Search ...................... 353/20, 33, 31, 353/34, 37, 81, 82, 122; 349/5, 7, 8, 9

(56) References Cited

U.S. PATENT DOCUMENTS

| | | | |
|---|---|---|---|
| 2002/0071102 A1 | * | 6/2002 | Takimoto et al. ............... 353/31 |
| 2002/0167646 A1 | * | 11/2002 | Ishii ........................... 353/31 |
| 2002/0171811 A1 | * | 11/2002 | Kodama et al. ............... 353/31 |

FOREIGN PATENT DOCUMENTS

| | | | |
|---|---|---|---|
| JP | 5323311 | 12/1993 | ........... G02F/13/35 |
| JP | 6148628 | 5/1994 | ........... G02F/13/35 |
| JP | 7005421 | 10/1994 | ........... G02F/13/35 |
| JP | 7013150 | 1/1995 | ........... G02F/13/35 |
| JP | 7013152 | 1/1995 | ........... G02F/13/35 |
| JP | 10104763 | 4/1998 | ........... G03B/33/12 |

* cited by examiner

Primary Examiner—Russell Adams
Assistant Examiner—Melissa J. Koval
(74) Attorney, Agent, or Firm—Morgan & Finnegan, LLP

(57) ABSTRACT

A projection-type image displaying device includes liquid crystal elements for modulating light rays having wavelength regions different from each other, a color combining optical element for combining the light rays modulated by the liquid crystal display elements, and a projection type optical system for projecting light rays combined by the color combining optical element to display an image. Polarizing elements are disposed on an incidence side and an exit side of the liquid crystal display elements. Optically anisotropic elements for correcting the optical anisotropy of each of the liquid crystal elements are disposed between the polarizing elements. An air-reduced distance Linp between an entrance pupil of the projection optical system and display surfaces of the liquid crystal display element and diagonal length Ldisp across corners of the display surface of the liquid crystal display elements meet the predetermined condition.

23 Claims, 10 Drawing Sheets

PROJECTION-TYPE IMAGE DISPLAYING DEVICE

BACKGROUND OF THE INVENTION

1. Field of the Invention

The present invention relates to a projection-type image displaying device to be used in a liquid crystal projector.

2. Related Background Art

Conventionally, a cross dichroic prism XDP has been generally used as a color combining optical element to be used in a projection-type image displaying device such as a liquid crystal projector. As shown in FIG. 15, the cross dichroic prism XDP is composed of four rectangular prisms 67, 68, 69 and 70 and dichroic layers DM1 and DM2 that have two kinds of reflection wave ranges different from each other and cross each other in the inside of the cross dichroic prism XDP.

Moreover, in case of the projection-type image displaying device using the cross dichroic prism XDP shown in FIG. 15, the incidence side of its projection lens is designed to be telecentric in order to prevent the generation of color shading owing to the cross dichroic prism XDP.

Furthermore, polarizing plates 11, 18 and 28 and polarizing plates 15, 22 and 32 are disposed on the incidence sides and the exit sides of liquid crystal panels (or liquid crystal display elements) 13, 20 and 30, respectively. And positive lenses 60, 61 and 66 are disposed on the light source sides of the liquid crystal panels 13, 20 and 30, respectively, and then the illumination light is made to be telecentric to the liquid crystal panels 13, 20 and 30, in order to prevent the generation of contrast unevenness of the liquid crystal panels 13, 20 and 30 caused by the changes of the incidence angles of illumination light to the liquid crystal panels 13, 20 and 30.

Moreover, for the improvement of contrast in such a projection-type image displaying device, Japanese Patent Application Laid-Open No. 5-323311, No. 6-148628 and No. 7-5421 propose configurations in which phase plates are disposed between polarizing plates disposed on both of the incident sides and the exit sides of liquid crystal display elements.

Moreover, Japanese Patent Application Laid-Open No. 7-13150 and No. 7-13152 propose configurations for improving the view angle characteristic of contrast in direct vision type image displaying devices using liquid crystal panels.

However, in the conventional projection-type image displaying device shown in FIG. 15, the dichroic layers DM1 and DM2 are bent at apical angles of the rectangular prisms 67 to 70 when the angles of the four rectangular prisms 67 to 70 are not correctly polished. Consequently, the conventional projection-type image displaying device has a problem such that an image projected on a screen (not shown) becomes a double image, which makes a feeling of resolution thereof remarkably worse. Moreover, when the four rectangular prisms 67 to 70 are joined, the joining requires scrupulous care lest differences in level should be occurred in order to keep the resolving power thereof on the screen good.

Furthermore, defects such as kinks, chips and the like are not allowed on the ridges (edge lines) of the rectangular prisms 67 to 70. When the width of the ridge portion is wide, a problem is also produced in which crossed portions between crossing prisms are projected on a screen as vertical stripes.

As described above, the conventional cross dichroic prism XDP is extremely hard to work a prism and to perform joining of prisms as a prism, and therefore it is difficult to reduce the manufacturing cost thereof.

On the other hand, for resolving such problems of the conventional cross dichroic prism XDP, Japanese Patent Application Laid-Open No. 10-104763 proposes a color separation prism applied to a liquid crystal projector. The color separation prism shown in FIG. 1 of the reference is composed of three prisms that have been used in a video camera or the like.

However, the shape of the color separation prism is not optimized to make the optical path length of the prism minimum. The color separation prism consequently requires an optical path length nearly twice as long as that of the cross dichroic prism.

That is, the manufacturing of the proposed color separation prism itself becomes easier in comparison with the manufacturing of the cross dichroic prism XDP because the dichroic films of the color separation prism do not cross each other in the inside of the prism. However, because the optical path length of the color separation prism is long, it is needed to set the back focal distance of the projection lens in the case of the use of the color separation prism considerably longer than that in the case of the use of the cross dichroic prism.

Consequently, the size of the projection lens in the case of the use of the color separation prism becomes large, which increases the manufacturing cost of the projection lens. Moreover, as for the performance of the projection lens especially, there is also a problem such that the chromatic aberration of magnification of the projection lens increases as the increase of the back focal distance.

Furthermore, Japanese Patent Application Laid-Open No. 5-323311 proposes a configuration in which phase difference correcting plates for correcting optical anisotropies of liquid crystal panels are disposed between incidence side polarizing plates and the liquid crystal panels for improving the contrast of the liquid crystal display elements.

In a normally white mode liquid crystal display element composed of a liquid crystal cell displaying white when the maximum voltage is applied thereto and polarizing plates disposed on the incidence side and the exit side of the liquid crystal cell, the incidence angle of illumination light at which the maximum contrast can be obtained is inclined by about three degrees from an angle perpendicular to the surface of the liquid crystal cell. Then, the main object of the configuration proposed in Japanese Patent Application Laid-Open No. 5-323311 is to compensate the phase shift produced in the liquid crystal cell by changing the phase differences of phase plates in accordance with positions.

The proposed configuration can set the liquid crystal cell to have the maximum contrast with respect to the principal ray of the illumination light that illuminates the liquid crystal cell. However, since a color image is obtained by superimposing projection images of three colors by the use of three liquid crystal panels and three projection lenses for combining three colors, there is raised a problem that the entire apparatus becomes large. Moreover, because there is only one point on the optical axis of the projection lens where the color images are completely superimposed on one another the configuration can be applied only to a rear projector or a fixed type front projector.

For resolving the constructive problems of the aforesaid configuration proposed in Japanese Patent Application Laid-Open No. 5-323311, Japanese Patent Application Laid-Open No. 6-148628 proposes to realize the improvement of contrast and the miniaturization of its size in a projection-type image displaying device which performs color combining by means of two dichroic mirrors, and in which a phase difference plate is disposed between the liquid crystal cell of a liquid crystal display element and the polarizing plate on the exit side of the liquid crystal display element so as to improve the contrast and to realize the miniaturization.

In the foregoing projection-type image displaying device, however, since the color combining is effected by the two dichroic mirrors, the back focal distance of the projection lens is needed to be twice or more as long as the length of the diagonal line of the effective display surface of the liquid crystal display element, which makes difficult to design the projection lens. Furthermore, the projection-type image displaying device has the problem of the difficulty of the complete superimposition of the projection images of three colors owing to the astigmatism caused by the dichroic mirrors and irregular deflections of their surfaces.

Moreover, the projection-type image displaying device proposed in Japanese Patent Application Laid-Open No. 6-148628 has a configuration to make the projection lens system telecentric by disposing a convex lens on the side of the projection lens of the liquid crystal display element in order to make the contrast on the image plane of a screen uniform. By employing such a configuration, the direction of the principal ray of the illumination light entering into the liquid crystal cell can be perpendicular to the surface of the liquid crystal cell anywhere on the surface. Consequently, the projection-type image displaying device does not need to change the phase of the phase plate in accordance with a position in the phase plate like the configuration proposed in Japanese Patent Application Laid-Open No. 5-323311. Then, the device has a merit of making the manufacturing of the phase plate easy.

However, the device has a problem of the decrease of contrast because light rays much enter into the liquid crystal cell from directions other than that of the angle at which the contrast becomes the maximum value in case of using a projection lens having a small f-number.

Moreover, the device proposed in Japanese Patent Application Laid-Open No. 6-148628 realizes the improvement of contrast by disposing the phase plate between the polarizing plate and the liquid crystal display element of the single-plate system liquid crystal projector having a color filer provided in the inside of the liquid crystal display element. However, because such a single-plate system utilizes light only one-third of that of three-plate system, the single-plate system has a disadvantage of the lack of sufficient brightness.

Furthermore, in the image displaying device proposed in Japanese Patent Application Laid-Open No. 7-5421, two phase plates are disposed between the polarizing plate on the incidence side and a liquid crystal cell or between the polarizing plate on the exit side and the liquid crystal cell, and at least one of the two phase plates is slightly inclined so that a slight phase difference is imparted to between light ways passing through the two phase plates to effect the phase compensation so as to improve the visual angle characteristic of the contrast and to improve the contrast on a screen surface.

Because the configuration proposed in the patent publication improves the visual angle characteristic of the contrast of the liquid crystal display element, the configuration has no possibility that the contrast is greatly decreased even if the configuration employs a projection lens having a small f-number.

However, the image displaying device proposed in the patent publication employs an optical system using two dichroic mirrors similar to those employed in the Japanese Patent Application Laid-Open No. 6-148628 as the color combining optical system thereof. The aforesaid problems in the color combination caused by the two dichroic mirrors are not resolved by the device proposed by Japanese Patent Application Laid-Open No. 7-5421.

Furthermore, in the image displaying device proposed in Japanese Patent Application Laid-Open No. 7-13150, at least one optically anisotropic element is disposed between two polarizing plates disposed on the incidence side and the exit side of a liquid crystal display element, respectively. In the image displaying device proposed in Japanese Patent Application Laid-Open No. 7-13152, two optically anisotropic elements are disposed between two polarizing plates. In the devices, the characteristics of the optically anisotropic elements and the disposition of the optical axes of the elements are restricted so that the optical anisotropies of their liquid crystal elements are corrected to correct the phase shift of polarized light that is produced in large magnitude when light enters into the liquid crystal elements obliquely. Consequently, the devices realize high contrast image displaying in wider angular ranges than those of conventional devices.

However, both the patent publications do not disclose any combination with a projection optical system.

SUMMARY OF THE INVENTION

One object of the invention is to realize a projection-type image displaying device using liquid crystals having the following features. The device is easy to manufacture. The device is capable of being miniaturized. The device can display images on a screen without any vertical stripes. And the device has a configuration in which resolving power on the screen by means of a color combining optical element is scarcely decreased.

In one aspect of the invention, a projection-type image displaying device comprises:

at least one image display element for modulating light from a light source; and a projection optical system for projecting light from the at least one image display element;

wherein an air-reduced distance Linp between an entrance pupil of the projection optical system and a display surface of the image display element and a diagonal length Ldisp across corners of the display surface of the image display element meet the following condition:

$$1.5 < Linp/Ldisp < 4 \quad (1)$$

In further aspect of the foregoing displaying device, the air-reduced distance Linp and the diagonal length Ldisp meet the following condition:

$$1.9 < Linp/Ldisp < 3.5 \quad (1A)$$

In further aspect of the foregoing displaying device, an incidence side of the projection optical system is configured as a non-telecentric system.

In further aspect of the foregoing displaying device, the image display element is a liquid crystal element.

In further aspect of the foregoing displaying device, the device further comprising:

polarizing elements disposed on an incidence side and exit side of the at least one image display element; and at least one optically anisotropic element disposed between the polarizing elements disposed on the incidence side and the exit side on an optical path on which the at least one image display element is disposed.

In further aspect of the foregoing displaying device, the at least one image display element is a plurality of image display elements for respectively modulating a plurality of light rays having wavelength ranges different from each other; and the device further comprises a color combining optical element for combining the light rays modulated by the plural image display elements, the color combining optical element including two dichroic films therein, the dichroic films not being crossed with each other in an inside of the color combining optical element.

In further aspect of the foregoing displaying device, at least one of the two dichroic films is formed with an inclined films whose thickness or refractive index changes in a specific direction.

In further aspect of the foregoing displaying device, the color combining optical element includes at least three prisms, and an exit surface of a prism nearest to the projection optical system among the three prisms reflects light that has entered from an incidence surface of the prism nearest to the projection optical system toward one of the two dichroic films, and surface light that has entered from the side of the one of the dichroic films emerges from the exit surface.

In further aspect of the foregoing displaying device, an angle θ1 formed by the exit surface of the prism nearest to the projection optical system in the color combining optical element and a surface of the prism which is in contact with the dichroic film, meets the following condition:

$$20 \text{ degrees} < \theta 1 < 35 \text{ degrees} \quad (2)$$

In further aspect of the foregoing displaying device, the angle θ1 meets the following condition:

$$23 \text{ degrees} < \theta 1 < 32 \text{ degrees} \quad (2A)$$

In further aspect of the foregoing displaying device, an angle θ2 formed by the exit surface of the prism nearest to the projection optical system in the color combining optical element and the dichroic film which is not in contact with the prism nearest to the projection optical system, meets the following condition:

$$40 \text{ degrees} < \theta 2 < 50 \text{ degrees} \quad (3)$$

In further aspect of the foregoing displaying device, the angle θ2 meets the following condition:

$$42 \text{ degrees} < \theta 2 < 48 \text{ degrees} \quad (3A)$$

In further aspect of the foregoing displaying device, the color combining optical element includes at least four prisms, two of which are disposed between the two dichroic films; and an exit surface of a prism nearest to the projection optical system among the four prisms reflects light that has entered from an incidence surface of the prism nearest to the projection optical system toward one of the two dichroic films, and light that has entered from the side of the one of the dichroic films emerges from the exit surface.

In further aspect of the foregoing displaying device, an angle θ1 formed by the exit surface of the prism nearest to the projection optical system in the color combining optical element and a surface of the prism which is in contact with the dichroic film meets the following condition:

$$20 \text{ degrees} < \theta 1 < 35 \text{ degrees}.$$

In further aspect of the foregoing displaying device, the angle θ1 meets the following condition:

$$23 \text{ degrees} < \theta 1 < 32 \text{ degrees}.$$

In further aspect of the foregoing displaying device, an angle θ2 formed by the exit surface of the prism nearest to the projection optical system in the color combining optical element and the dichroic film which is not in contact with the prism nearest to the projection optical system, meets the following condition:

$$40 \text{ degrees} < \theta 2 < 50 \text{ degrees}.$$

In further aspect of the foregoing displaying device, the angle θ2 meets the following condition:

$$42 \text{ degrees} < \theta 2 < 48 \text{ degrees}.$$

In further aspect of the foregoing displaying device, the device further comprising a microlens array having lenses corresponding to respective pixels of the image display element, the microlens array being disposed on an incidence side of the image display element, wherein a distance between optical axes of the lenses of the microlens array are larger than a distance between pixel apertures of the image display element.

In another aspect of the invention, a projection-type image displaying device comprises:

a plurality of liquid crystal display elements for modulating a plurality of light rays having wavelength regions different from each other respectively;

a color combining optical element for combining the light rays modulated by the plural liquid crystal display elements;

a projection optical system for projecting a light ray combined by the color combining optical element;

polarizing elements disposed on an incidence side and an exit side of each of the plural liquid crystal display elements; and at least one optically anisotropic element disposed between the polarizing elements on the incidence side and the exit side of each of the liquid crystal elements in an optical path of at least one light ray among the plural light rays;

wherein a light incidence side of the projection optical system is configured to be a non-telecentric system and an air-reduced distance Linp between an entrance pupil of the projection optical system and display surface of the liquid crystal display element and diagonal length Ldisp across corners of the display surface of the liquid crystal display element meet the following condition:

$$1.5 < Linp/Ldisp < 4.$$

In further aspect of the foregoing displaying device, the air-reduced distance Linp and the diagonal length Ldisp meet the following condition:

$$1.9 < Linp/Ldisp < 3.5.$$

In further aspect of the foregoing displaying device, the device further comprising a microlens array having lenses corresponding to respective pixels of the liquid crystal display element, the microlens array being disposed on the incidence side of the liquid crystal display element, wherein a distance between optical axes of the lenses of the microlens array is larger than a distance between pixel apertures of the liquid crystal display element.

In still another aspect of the invention, a image display system comprises:

The foregoing projection-type image displaying device; and an image information supplying device for supplying image information to be projected and displayed by the projection-type image displaying device.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF THE PREFERRED EMBODIMENTS (First Embodiment)

Figure 1:
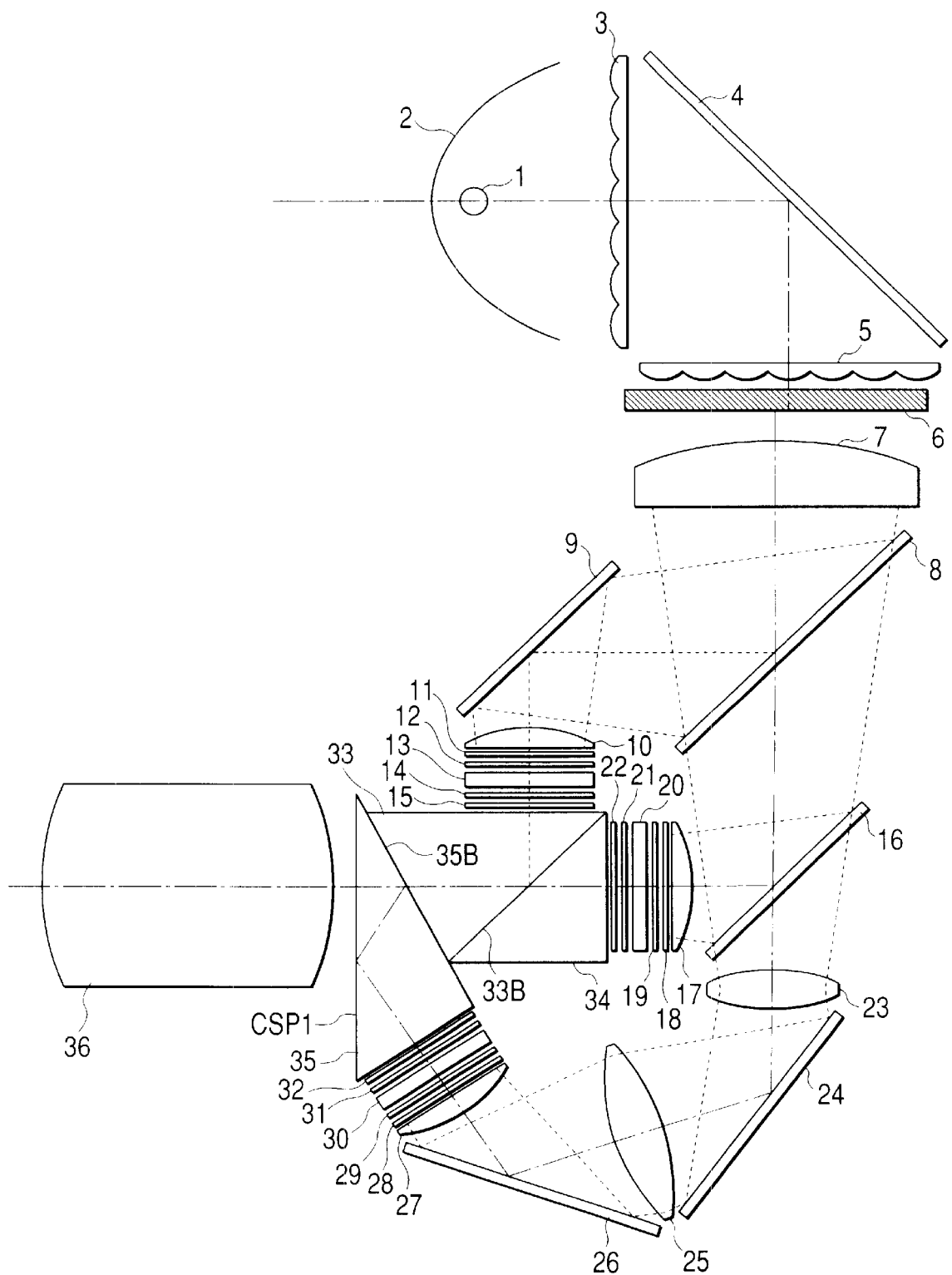
FIG. 1 is an optical cross section of a liquid projector according to a first embodiment of the present invention.

FIG. 1 shows an optical configuration of a liquid crystal projector (or a projection-type image displaying device) according to a first embodiment of the present invention.

White light emitted by a light source 1 is converted into substantially parallel light beam by a parabolic mirror 2. The light beam passes through a first fly-eye lens 3 composed of a plurality of rectangular lens arrays, and then the light beam is reflected by a reflecting mirror 4. The reflected light beam then passes through a second fly-eye lens 5 composed of a plurality of rectangular lens arrays. Thereby, the image of the light source 1 is formed at substantially the center part of each lens of the second fly-eye lens 5.

The beam fluxes that have passed through the second fly-eye lens 5 are converted to have only the light components polarized in one direction by a polarization converting element 6, and the light beam is condensed by a first positive lens 7 and is irradiated onto a dichroic mirror 8 reflecting only blue color light component.

The blue color light component reflected by the dichroic mirror 8 is reflected by a high reflection mirror 9, and then passes through a second positive lens 10, a polarizing plate 11 on the incidence side of a liquid crystal panel (or a liquid crystal display element) 13 for the blue color light component, and a phase plate (or an optically anisotropic element) 12 on the incidence side, in the order. After that, the blue color light component is condensed on the display part of the liquid crystal panel 13.

The green color light component among the green and the red color light components that have passed through the dichroic mirror 8 is reflected by a dichroic mirror 16 reflecting only green color light component. The reflected green color light component passes through a third positive lens 17, a polarizing plate 18 on the incidence side of a liquid crystal panel (or a liquid crystal element) 20 for the green color light component, and a phase plate (or an optically anisotropic element) 19 on the incidence side, in the order. After that, the green color light component is condensed on the display part of the liquid crystal panel 20.

Moreover, the red color light component that has passed through the dichroic mirror 16 passes through a fourth positive lens 23, and then is reflected by a high reflection mirror 24. The reflected red color light component passes through a fifth positive lens 25, and then is reflected by a high reflection mirror 26. After that, the reflected red color light component passes through a sixth positive lens 27, a polarizing plate 28 on the incidence side of a liquid crystal panel (or a liquid crystal element) 30 for the red color light component, and a phase plate (or an optically anisotropic element) 29 on the incidence side, in the order. And then, the red color light component is condensed on the display part of the liquid crystal panel 30.

Because only the optical path of the red color channel is longer than the other optical paths of the other color channels, the fourth positive lens 23 and the fifth positive lens 25 are provided for performing the roles of relay lenses for imaging the red color light component substantially at the same magnification as those of the other color light components.

Each of the color light components that has thus been separated into a monochromatic light component is modulated by the liquid crystal panels 13, 20 and 30 that operate on image signals supplied from an image information supplying apparatus such as a television, a video recorder, a digital versatile disk (DVD), a personal computer or the like. Then, the modulated color light components are combined by a color combining prism (or a color combining optical element) CSP1 composed of a combination of a first prism 35, a second prism 33 and a third prism 34. The color-combined light exits from the exit plane of the first prism 35 being the exit plane of the color combining prism CSP1, and the light that has exited from the color combining prism CSP1 is projected on a screen (not shown) by a projection lens (or a projection optical system) 36. Consequently, a color image is projected on the screen.

In this configuration, phase plates (or optically anisotropic elements) 14, 21 and 31 on the exit sides of the liquid crystal panels 13, 20 and 30 and polarizing plates 15, 22 and 32 on the exit sides are respectively disposed in the order from the sides of the liquid crystal panels 13, 20 and 30 between the color combining prism CSP1 and the liquid crystal panels 13, 20 and 30.

Because the present embodiment has a configuration including the polarizing plates 11, 18 and 28 on the incidence sides, the phase plates 12, 19 and 29 on the incidence sides, which function to compensate (or correct) the optical anisotropies of the liquid crystal panels 13, 20 and 30, the liquid crystal panels 13, 20 and 30, the phase plates 14, 21 and 31 on the exit sides, and the polarizing plates 15, 22 and 32 on the exit sides in the order from the sides of the incidence sides of illumination light into the liquid crystal panels 13, 20 and 30 around the liquid crystal panels 13, 20 and 30, the embodiment can decrease the lowering of contrast in a large extent when the illumination light enters the liquid crystal panels 13, 20 and 30 obliquely, in comparison with the conventional liquid crystal projector having the configuration composed of only the polarizing plates on the incidence sides, the liquid crystal panels and the polarizing plates on the exit sides.

And, even if the telecentric property on the incidence side of the projection optical system 36 is largely disordered, the lowering of the contrast at the peripheral regions of the display parts of the liquid crystal panels 13, 20 and 30 can greatly be reduced by means of the application of the features of the configuration of the present embodiment.

Moreover, when the incidence side of the projection optical system 36 is configured to be a non-telecentric system, incident angles of light rays into dichroic films of the color combining prism CSP1 differ at positions. The possibility of the occurrence of color shading on the screen surface is consequently created. However, the possibility can be reduced by the formation of the dichroic films to be inclined films having thicknesses or refraction indices changing with a slope in a predetermined direction.

A film having an advantage of improving a contrast view angle for a direct vision type liquid crystal element such as the product named as "Wide View Film" or the like being available from Fuji Photo Film Co., Ltd. can be used as each of the phase plates 12, 14, 19, 21, 29 and 31. By means of the combination of the film having the advantage of improving a contrast view angle and the inclined dichroic film, the color combining prism CSP1 and the projection lens 36 can be miniaturized while suppressing the occurrence of the color shading.

Incidentally, in the conventional liquid crystal projector, the contrast shading on a screen is suppressed by causing illumination light to be perpendicularly incident on the liquid crystal panels. For this reason, the projection lens is designed to be telecentric on the incidence side of light. Further, for the sake of the suppression of the color unevenness owing to the color combining prism, the pupil position on the incidence side of the projection lens is set to be much distant from the positions of the liquid crystal panels (for example, the pupil positions being set at an infinite-point), so that the projection lens is designed to be telecentric.

For this reason, the conventional liquid crystal projector has the problem that the projection lens and the color combining prism to be used in combination with the projection lens become larger in their sizes.

When a projection lens is designed to be telecentric on the incidence side thereof, the height of the off-axis principal ray at the incidence side from the optical axis becomes greater, and the chromatic aberration of magnification of the projection lens becomes large. Further, since the lens diameter on the incidence side of the projection lens becomes large, the effective diameter on the exit side of the color combining prism becomes large in proportion to the increase of the lens diameter of the projection lens. The increase of the effective diameter on the exit side brings about the increase of the size of the color combining prism.

On the contrary, according to the present embodiment, the view angle characteristics of the liquid crystal panels is improved by disposing at least one phase plate having an effect of compensating optical anisotropy produced in the liquid crystal panel between the two polarizing plates.

Moreover, according to the present embodiment, the dichroic film of the color combining prism is made to an inclined film whose thicknesses or refractive index changes in a slop-like configuration, so that the miniaturization of the color combining prism CSP1 and the projection lens 36 is realized, and the occurrence of color unevenness and contrast shading on a screen can be suppressed.

Incidentally, FIG. 1 shows the configuration in which two phase plates are disposed between two polarizing plates. However, only one phase plate may be disposed between the two polarizing plates as long as the optical anisotropy produced by the liquid crystal panel can be compensated.

Figure 2:
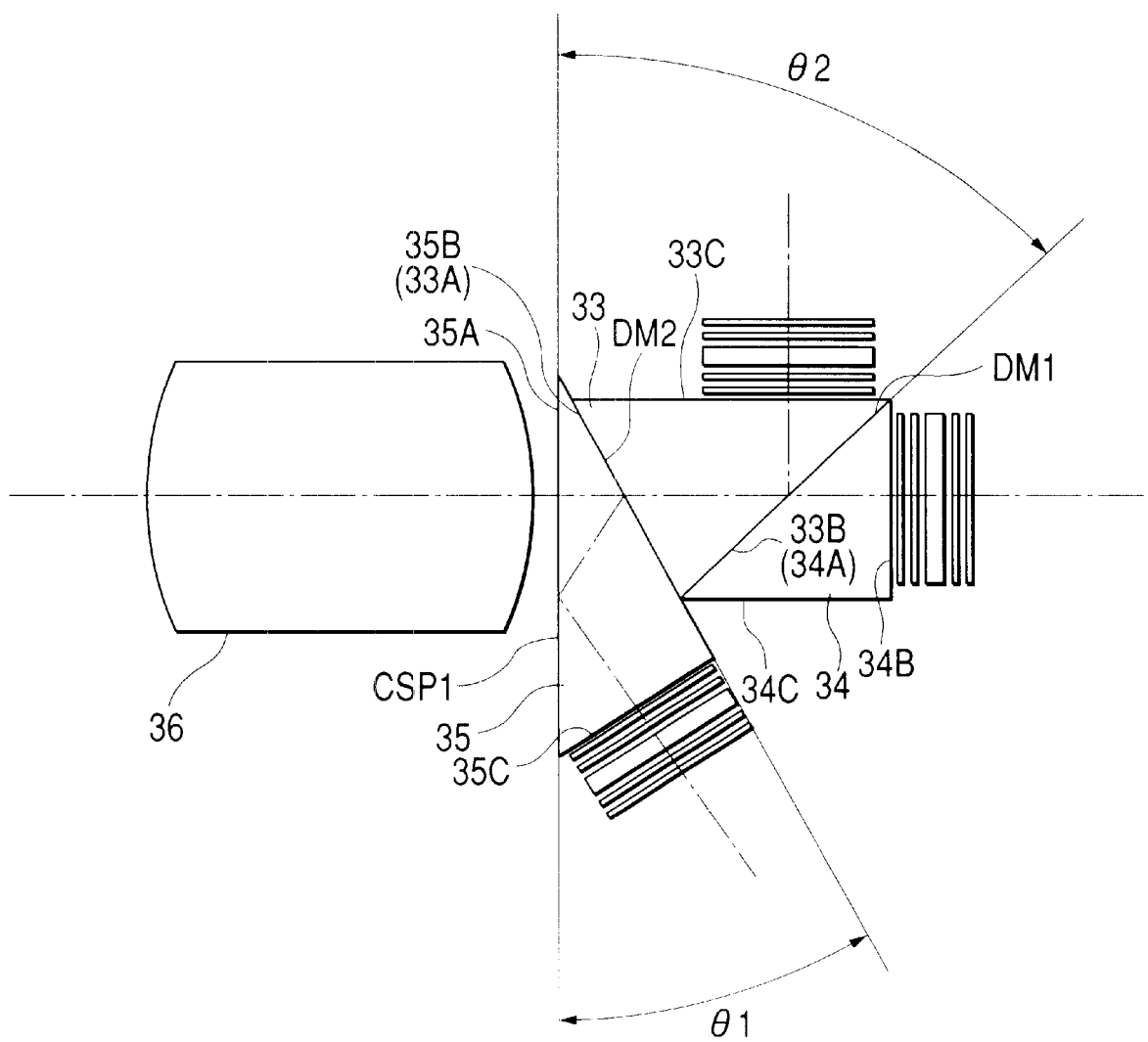
FIG. 2 is an optical cross section of a color combining optical element and a projection optical system of the liquid crystal projector.

FIG. 2 shows the optical configuration of the color combining prism CSP1 and the projection lens 36 of the projection-type image displaying device of the present embodiment shown in FIG. 1.

The color combining prism CSP1 is composed of the combination of the first prism 35, the second prism 33 and the third prism 34 as shown in FIG. 2. The first prism 35 includes a surface (or an exit surface) 35A which is a transmission surface and also is a total reflection surface, a dichroic surface 35B (which comes in contact with a dichroic film DM2 reflecting a red color light component) on which the dichroic film DM2 reflecting the red color light component and transmitting blue and green color light components is formed, and a transmission surface (or an incidence plane) 35C which is an incidence surface from which the red color light component enters into the first prism 35. The second prism 33 includes two transmission surfaces (or an incidence surface of the blue color light component and an exit surface to the dichroic film DM2 reflecting the red color light component) 33C and 33A, and a dichroic surface 33B on which a dichroic film DM1 reflecting the blue color light component and transmitting the green color light component is formed. The third prism 34 includes two transmission surfaces (or an incidence surface of the green color light component and an exit surface to the dichroic film DM1 reflecting the blue light component) 34B and 34A.

In the configuration shown in FIG. 2, it is desirable to form an anti-reflection coating on the respective transmission surfaces 35A, 35C, 33C and 34B for the prevention of loss of the quantity of light owing to the surface reflection light produced at an interface between the air and a glass.

Moreover, for the prevention of generation of a ghost owing to internal reflection in the inside of the third prism 34, the surface 34C of the third prism 34 is not preferably formed as a ground surface but formed as a sand-floated surface, and further it is more preferable to form a black coating on the surface 34C.

Incidentally, in the present embodiment, the dichroic film DM2 reflecting the red color light component is formed on the dichroic surface 35B of the first prism 35, but the dichroic film DM1 may be formed on the transmission surface 33A of the second prism 33.

Moreover, the dichroic film DM2 reflecting the blue color light component, which is formed on the dichroic surface 33B of the second prism 33, may be formed on the transmission plane 34A of the third prism 34 in place of the dichroic surface 33B.

Moreover, in the present embodiment, an angle θ1 formed by the exit surface 35A of the first prism 35 and the dichroic surface 35B between the first prism 35 and the second prism 33 is set at 28 degrees.

Thereby, the optical path length of the color combining prism CSP1 can be shortened, and the occurrence of a ghost owing to reflection on the dichroic surface can be suppressed. Moreover, the angle θ1 can meet the total reflection condition on the exit plane 35A of the first prism 35 sufficiently.

On the other hand, an angle θ2 formed by the exit surface 35A of the first prism 35 and the dichroic surface 33B between the second prism 33 and the third prism 34 is set at 45 degrees.

Thereby, the optical path length of the color combining prism CSP1 can be shortened. Consequently, not only the size of the color combining prism CSP1 itself can be miniaturized, but also the back focal distance of the projection lens 36 can be shortened, which makes it possible to miniaturize the size of the projection lens 36 and to improve the performance of the projection lens 36.

Moreover, the present embodiment is designed to disorder the telecentric property on the incidence side of the projection lens 36 by placing the pupil position on the incidence side of the projection lens 36 close to the liquid crystal panels 13, 20 and 30 for the sake of the miniaturization of the color combining prism CSP1.

Consequently, the possibility such that the incidence angles of light into the dichroic surfaces 35B and 33B change according to places on the surfaces 35B and 33B to produce color unevenness on the screen not shown is produced. Accordingly, the dichroic surfaces 35B and 33B may be configured to be inclined films whose thicknesses or refractive indices that gradually change in the vertical direction (or a specific direction) in FIG. 2 (in an inclined state).

To put it concretely, in the dichroic film DM1 for reflecting the blue color light component, because the incident angle of a light ray on the upper side of the dichroic film DM1 in FIG. 2 is greater than that on the lower side of the dichroic film DM1, the dichroic film DM1 is formed as an inclined film such that the thickness on the upper side is made thicker than the thickness on the lower side or that the refractive index on the upper side is made greater than the refractive index on the lower side. Thereby, color unevenness can be reduced.

Also, in the dichroic film DM2 for reflecting the red color light component, because the incident angle of a light ray on the lower side of the dichroic film DM2 in FIG. 2 is greater than that on the upper side of the dichroic film DM2, the dichroic film DM2 is formed as an inclined film such that the thickness on the lower side is made greater than the thickness on the upper side on that the refractive index on the lower side is made greater than the refractive index on the upper side. Thereby, color unevenness can be reduced.

(Second Embodiment)

Figure 3:
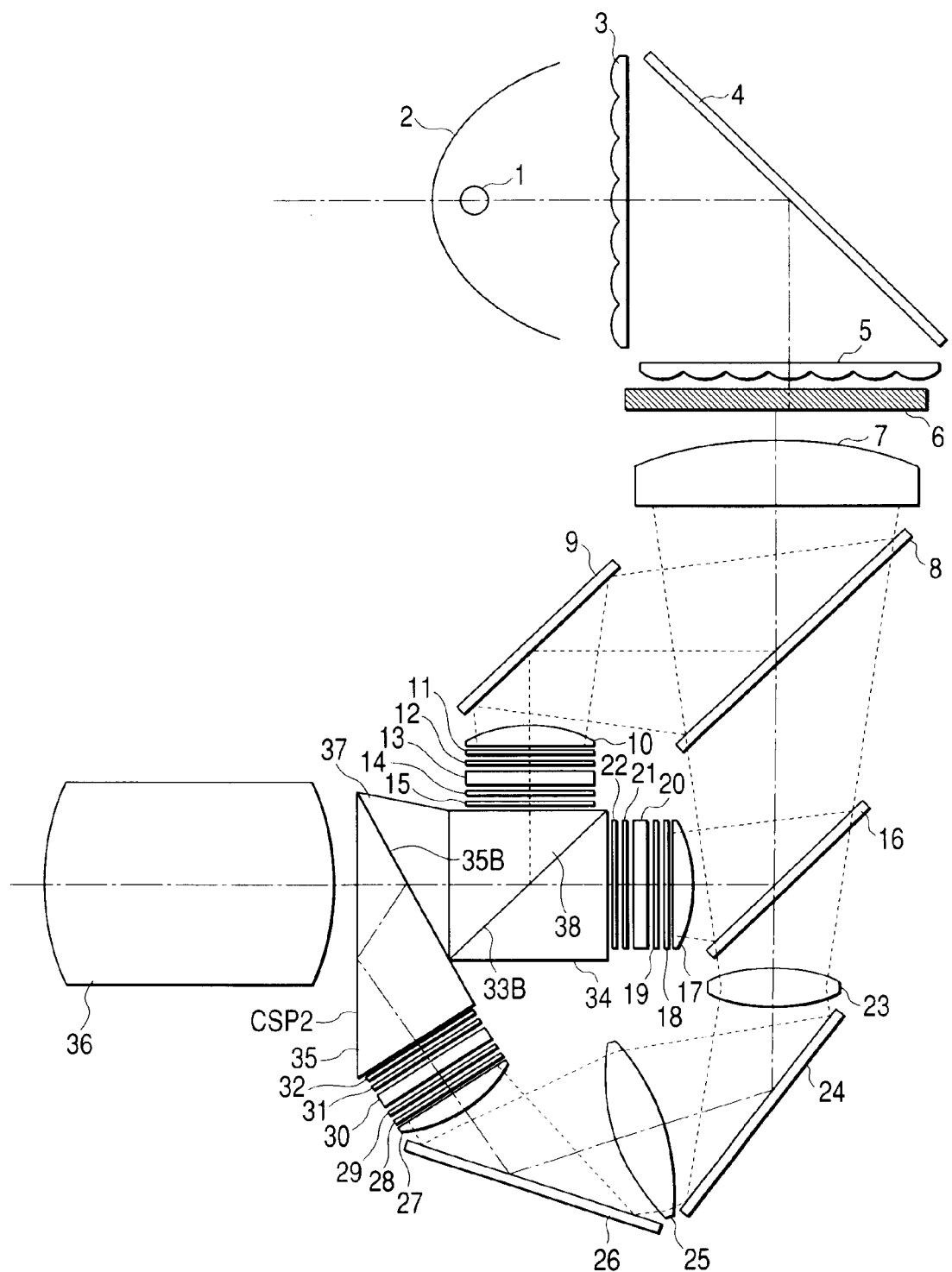
FIG. 3 is an optical cross section of a liquid crystal projector according to a second embodiment of the present invention.

FIG. 3 shows an optical configuration of a liquid crystal projector (or a projection-type image displaying device) according to a second embodiment of the present invention.

White light emitted by the light source 1 is converted into substantially parallel light beam by the parabolic mirror 2. The light beam passes through the first fly-eye lens 3 composed of a plurality of rectangular lens arrays, and then the light beam is reflected by the reflecting mirror 4. The reflected light beam then passes through the second fly-eye lens 5 composed of a plurality of rectangular lens arrays. Thereby, the image of the light source 1 is formed at substantially the center part of each lens of the second fly-eye lens 5.

The light beam that have passed through the second fly-eye lens 5 is converted to have only the light components polarized in one direction by the polarization converting element 6, and the light beam is condensed by the first positive lens 7 to be irradiated onto the dichroic mirror 8 reflecting only blue color light component.

The blue color light component reflected by the dichroic mirror 8 is reflected by the high reflection mirror 9, and then passes through the second positive lens 10, the polarizing plate 11 on the incidence side of the liquid crystal panel (or the liquid crystal display element) 13 for the blue color light component, and the phase plate (or the optically anisotropic element) 12 on the incidence side, in the order. After that, the blue color light component is condensed on the display part of the liquid crystal panel 13.

The green color light component among the green and the red color light components that have passed through the dichroic mirror 8 is reflected by the dichroic mirror 16 reflecting only green color light component. The reflected green color light component passes through the third positive lens 17, the polarizing plate 18 on the incidence side of the liquid crystal panel (or the liquid crystal element) 20 for the green color light component, and the phase plate (or the optically anisotropic element) 19 on the incidence side, in the order. After that, the green color light component is condensed on the display part of the liquid crystal panel 20.

Moreover, the red color light component that has passed through the dichroic mirror 16 passes through the fourth positive lens 23, and then is reflected by the high reflection mirror 24. The reflected red color light component passes through the fifth positive lens 25, and then is reflected by the high reflection mirror 26. After that, the reflected red color light component passes through the sixth positive lens 27, the polarizing plate 28 on the incidence side of the liquid crystal panel (or the liquid crystal element) 30 for the red color light component, and the phase plate (or the optically anisotropic element) 29 on the incidence side, in the order. And then, the red color light component is condensed on the display part of the liquid crystal panel 30.

Because only the optical path of the red color channel is longer than the other optical paths of the other color channels, the fourth positive lens 23 and the fifth positive lens 25 are provided for performing the roles of relay lenses for imaging the red color light component substantially at the same magnification as those of the other color light components.

The respective color light components that have thus been separated into a monochromatic light component are modulated by the corresponding liquid crystal panels 13, 20 and 30 that operate on image signals supplied from an image information supplying apparatus such as a television, a video recorder, a DVD, a personal computer or the like. Then, the modulated color light components are combined by a color combining prism (or a color combining optical element) CSP2 composed of a combination of a first A-prism 35, a second A-prism 37, a third A-prism 38 and a fourth A-prism 34. The color-combined light emerges from the exit surface of the first A-prism 35 which is the exit surface of the color combining prism CSP2, and the light that has emerged from the exit surface is projected on a screen (not shown) by the projection lens (or the projection optical system) 36. Consequently, a color image is projected on the screen.

In this configuration, the phase plates (or the optically anisotropic elements) 14, 21 and 31 on the exit sides of the liquid crystal panels 13, 20 and 30 and the polarizing plates 15, 22 and 32 on the exit sides are respectively disposed in the order from the sides of the liquid crystal panels 13, 20 and 30 between the color combining prism CSP2 and the liquid crystal panels 13, 20 and 30.

According to the present embodiment, view angle characteristics of the liquid crystal panels 13, 20 and 30 is improved by disposing at least one phase plate having an effect of compensating optical anisotropy produced in the liquid crystal panel between the two polarizing plate.

Moreover, according to the present embodiment, the dichroic films of the color combining prism CSP2 are formed to be inclined films whose thicknesses or refractive indices change in a slope-like configuration, so that the miniaturization of the color combining prism CSP2 and the projection lens 36 can be attained, and the occurrence of color unevenness and contrast shading on the screen can be suppressed.

Figure 4:
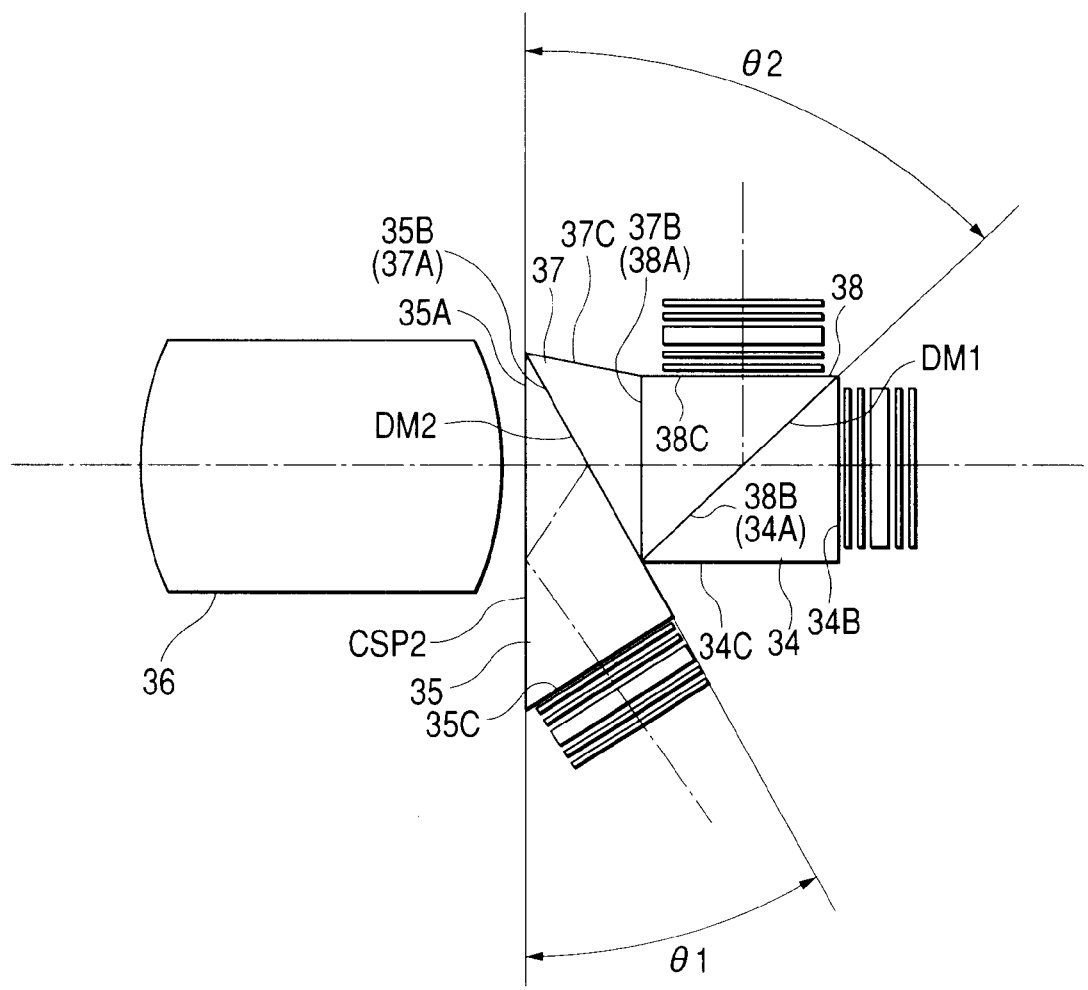
FIG. 4 is an optical cross section of a color combining optical element and a projection optical system of the liquid crystal projector of the second embodiment.

FIG. 4 shows the optical configuration of the color combining prism CSP2 and the projection lens 36 of the projection-type image displaying device of the present embodiment shown in FIG. 3.

The color combining prism CSP2 is composed of the combination of the first A-prism 35, the second A-prism 37, the third A-prism 38 and the fourth A-prism 34 as shown in FIG. 4. The first A-prism 35 includes the surface (or the exit plane) 35A which is the transmission surface and is also the total reflection surface, the dichroic surface 35B (which comes into contact with the dichroic film DM2 reflecting the red color light component) on which the dichroic film DM2 reflecting the red color light component and transmitting the blue and the green color light components is formed, and the transmission surface (or the incidence surface) 35C which is the incidence surface from which the red color component enters into the first A-prism 35. The second A-prism 37 includes two transmission surfaces (or an incidence surface of the light component from the third A-prism 38 and an exit surface of light components to the dichroic film DM2 reflecting the red light component) 37B and 37A. The third A-prism 38 includes two transmission surfaces (or an incidence surface of the blue color light component and an exit surface of light components to the second A-prism 37) 38C and 38A, and a dichroic surface 38B on which the dichroic film DM1 reflecting the blue color light component and transmitting the green color light component is formed. The fourth A-prism 34 includes the two transmission surfaces (or the incidence surface of the green color light component and the exit surface to the dichroic film DM1 reflecting the blue light component) 34B and 34A.

In the configuration shown in FIG. 4, it is preferable to form an anti-reflection coating on the respective transmission surfaces 35A, 35C, 38C and 34B for the prevention of the loss of the quantity of light owing to the surface reflection light produced at an interface between the air and a glass.

Moreover, for the prevention of the generation of a ghost owing to internal reflection in the inside of the second A-prism 37 and the fourth A-prism 34, the surface 37C of the second A-prism 37 and the surface 34C of the fourth A-prism 34 are not preferably formed as a ground surface but formed as a sand-floated surface, and further it is more preferable to form a black coating on the surfaces 37C and 34C.

Incidentally, in the present embodiment, the dichroic film DM2 reflecting the red color light component is formed on the dichroic surface 35B of the first A-prism 35, but the dichroic film DM2 may be formed on the transmission surface 37A of the second A-prism 37. Because the second A-prism 37 is smaller than the first A-prism 35, more second A-prisms 37 can be put in an evaporation furnace when the dichroic film DM2 is formed on the second A-prisms 37. Consequently, the manufacturing cost of the combining prism CSP2 can be lowered.

Moreover, the dichroic film DM2 reflecting the blue color light component, which is formed on the dichroic surface 38B of the third A-prism 38, may be formed on the transmission surface 34A of the fourth A-prism 34 in place of the dichroic surface 38B.

For the shortening of the optical path length of the color combining prism CSP2, the color combining prism CSP2 is composed of the four A-prisms 35, 37, 38 and 34 in contrast to a conventional prism composed of three prisms that has frequently been used for as a color separation prism.

And, by the division of the prism sandwiched by the two dichroic films DM1 and DM2 into the two A-prisms 37 and 38, the eclipse of an effective light beam on the exit side by the A-prisms 37 and 38 can be prevented and the A-prisms 34 and 38 on the incidence side can be made to be small in their sizes.

Moreover, in the present embodiment, the angle $\theta 1$ formed by the exit surface 35A of the first A-prism 35 and the dichroic surface 35B between the first A-prism 35 and the second A-prism 37 is set at 28 degrees. Thereby, the optical path length of the color combining prism CSP2 can be shortened, and the occurrence of a ghost owing to reflection on the dichroic surface 35B can be suppressed. Moreover, the angle $\theta 1$ can meet the total reflection condition on the exit plane 35A of the first A-prism 35 sufficiently.

On the other hand, the angle $\theta 2$ formed by the exit plane 35A of the first A-prism 35 and the dichroic plane 38B between the third A-prism 38 and the fourth A-prism 34 is set at 45 degrees. Thereby, the optical path length of the color combining prism CSP2 can be shortened. Consequently, not only the size of the color combining prism CSP2 itself can be miniaturized, but also the back focal distance of the projection lens 36 can be shortened, which makes it possible to miniaturize the size of the projection lens 36 and to improve the performance of the projection lens 36.

Moreover, the present embodiment is designed to disorder the telecentric property on the incidence side of the projection lens 36 by placing the pupil position on the incidence side of the projection lens 36 close to the liquid crystal panels 13, 20 and 30 for the sake of the miniaturization of the color combining prism CSP2.

Consequently, there is a possibility that the incidence angles of light into the dichroic surfaces 35B and 38B change according to positions on the surfaces 35B and 38B to result in occurrence of color unevenness on the screen not shown. Accordingly, the dichroic surfaces 35B and 38B may be configured to be inclined films whose thicknesses or refractive indices gradually change in the vertical direction (or a specific direction) in FIG. 4 (in a slope-like configuration).

To put it concretely, in the dichroic film DM1 for reflecting the blue color light component, because the incident angle of light on the upper side of the dichroic film DM1 in FIG. 4 is greater than that on the lower side of the dichroic film DM1, the dichroic film DM1 is formed as an inclined film such that the thickness on the upper side is made greater than the thickness on the lower side on that the refractive index on the upper side is made greater than the refractive index on the lower side. Thereby, color unevenness can be reduced.

Moreover, in the dichroic film DM2 for reflecting the red color light component, because the incident angle of light on the lower side of the dichroic film DM2 in FIG. 4 is greater than that on the upper side of the dichroic film DM2, the dichroic film DM2 is formed as an inclined film such that the thickness on the lower side is made greater than the thickness on the upper side or that the refractive index on the lower side is made greater than the refractive index on the upper side. Thereby, color unevenness can be reduced.

(Third Embodiment)

Figure 5:
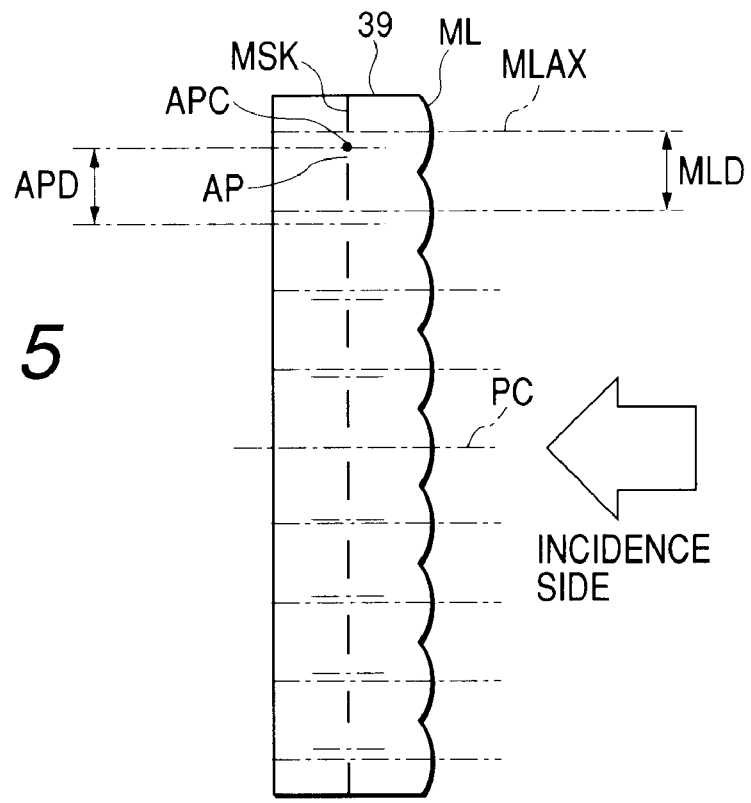
FIG. 5 is an optical cross section of a liquid crystal display element to be used in each of the embodiments.
Figure 6:
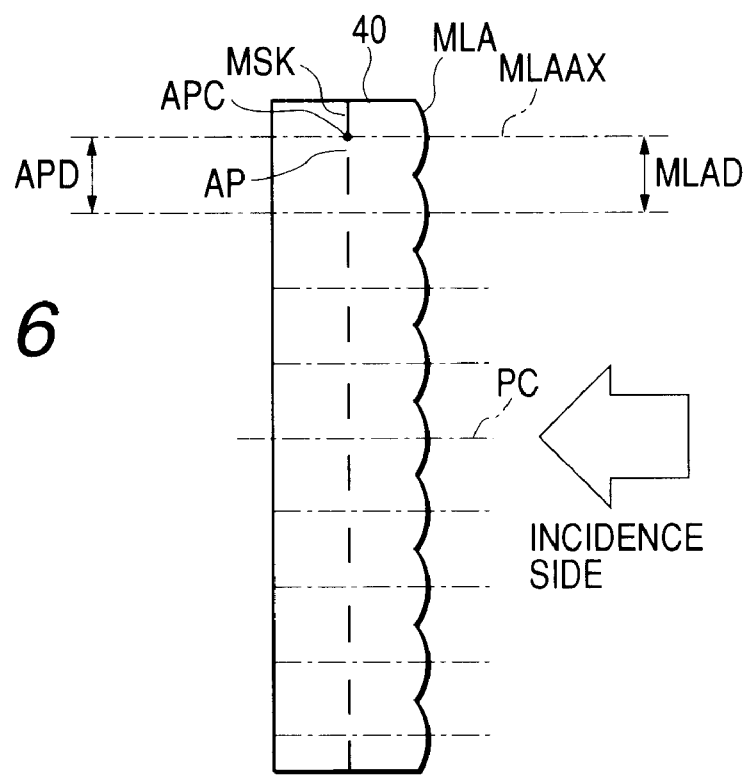
FIG. 6 is an optical cross section of a conventional liquid crystal display element with a microlens.

FIG. 5 shows a configuration of a liquid crystal panel provided with a microlens array that is applicable to the liquid crystal projectors of the first embodiment and the second embodiment. Moreover, FIG. 6 shows a configuration of a conventional liquid crystal panel provided with a microlens array.

In the conventional liquid crystal panel 40 shown in FIG. 6, a center distance APD between pixel apertures AP (hereinafter, referred to as a "pixel aperture distance") is the same as the distance MLAD between optical axes of the microlens array MLA. For this reason, when the off-AXIS principal ray of illumination light obliquely enters into the liquid crystal panels 13, 20 and 30 in the peripheral portions thereof like the aforesaid first embodiment and the second embodiment, the optical source images formed by the microlens array MLA are eclipsed by masking parts MSK. Consequently, conventional liquid crystal panel 40 has a problem such that the peripheral regions of a screen become dark.

For resolving the problem, in the liquid crystal panel 39 of the present embodiment, as shown in FIG. 5, the distances MLD between optical axes of the microlens array MLA are set to be larger than the pixel aperture distances APD for decreasing the eclipses of the light source images owing to the masking parts MSK.

Generally, because the position of the entrance pupil of the projection lens 36 is needed to be disposed as near as possible to the liquid crystal panels 13, 20 and 30 in order to form the color combining prisms CSP1 and CSP2 small in their sizes, the eclipses of the light source images around the peripheral portions of the liquid crystal panel 39 can be decreased by the setting of the distances MLD between optical axes of the microlens array MLA, which is disposed at a position of the light source side with respect to the liquid crystal panel 39, to be larger than the pixel aperture distances APD.

NUMERICAL EXAMPLE 1

Figure 7:
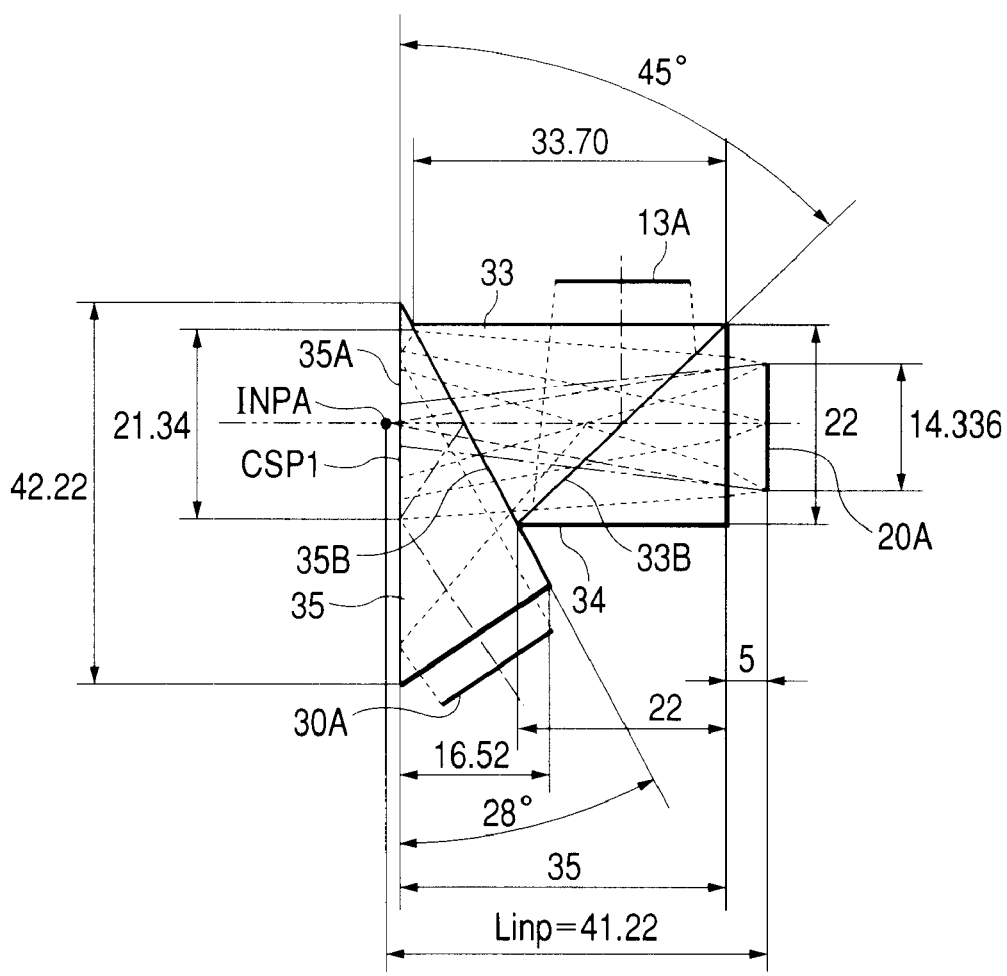
FIG. 7 is a diagram showing a numerical example 1 of a color combining prism corresponding to the first embodiment.
Figure 8:
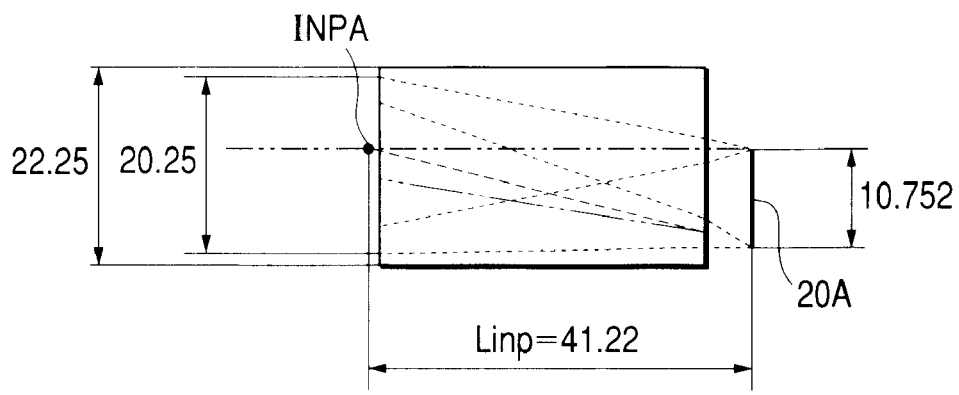
FIG. 8 is another diagram showing the numerical embodiment 1 of the color combining prism corresponding to the first embodiment.

FIG. 7 and FIG. 8 show a numerical example of the color combining prism CSP1 corresponding to the first embodiment. Incidentally, FIG. 7 and FIG. 8 respectively show cross sections in the long side direction of a liquid crystal panel and the short side direction thereof.

In the numerical example, a width (diagonal length) Ldisp across corners of the effective display region of the liquid crystal panel is 17.92 mm, and the f-number of the projection lens 36 is 1.7.

And the position INPA of the entrance pupil of the projection lens 36 is set at a position near to a not shown screen by 41.22 mm (=2.3*Ldisp) as an air-reduced distance Linp from the display surface 20A of the liquid crystal panel.

S-BSL7 (having a refractive index 1.51633 for d-line, and an Abbe number of 64.15) available from Ohara, Inc. is used as the glass material of the color combining prism CSP1.

Moreover, the angle formed by the exit surface 35A of the first prism 35 and the dichroic surface 35B reflecting the red color light component is set at 28 degrees.

Moreover, the angle formed by the exit surface 35A of the first prism 35 and the dichroic surface 33B reflecting the blue color light component is set at 45 degrees.

In the present example, because the position INPA of the entrance pupil of the projection lens 36 is disposed at a position extremely near to the exit surface 35A of the color combining prism CSP1, the effective diameter of light ray at the exit surface 35A of the color combining prism CSP1 can remarkably be small, and thereby the remarkable miniaturization of the color combining prism CSP1 can be achieved.

Incidentally, the volume of the color combining prism CSP1 is 21.392 cm$^3$. When the weight of the prism CSP1 is calculated by multiplying the volume of 21.392 cm$^3$ by the specific gravity of S-BSL7 of 2.52, the weight of 53.908 g is obtained. The obtained weight is lighter than that of the conventional cross dichroic prism.

Moreover, a glass having a higher refractive index than that of the glass of the conventional prism may be used for shortening the air-reduced optical path length of the color combining prism CSP1. It is preferable to use, for example, S-BSM25 (having a refractive index 1.62299 for d-line, and an Abbe number of 50.9) or S-BSM15 (having a refraction index of D line of 1.62299, and an Abbe number of 58.2), both available from Ohara, Inc., because they have a high refractive index and a high transmission factor.

NUMERICAL EXAMPLE 2

Figure 9:
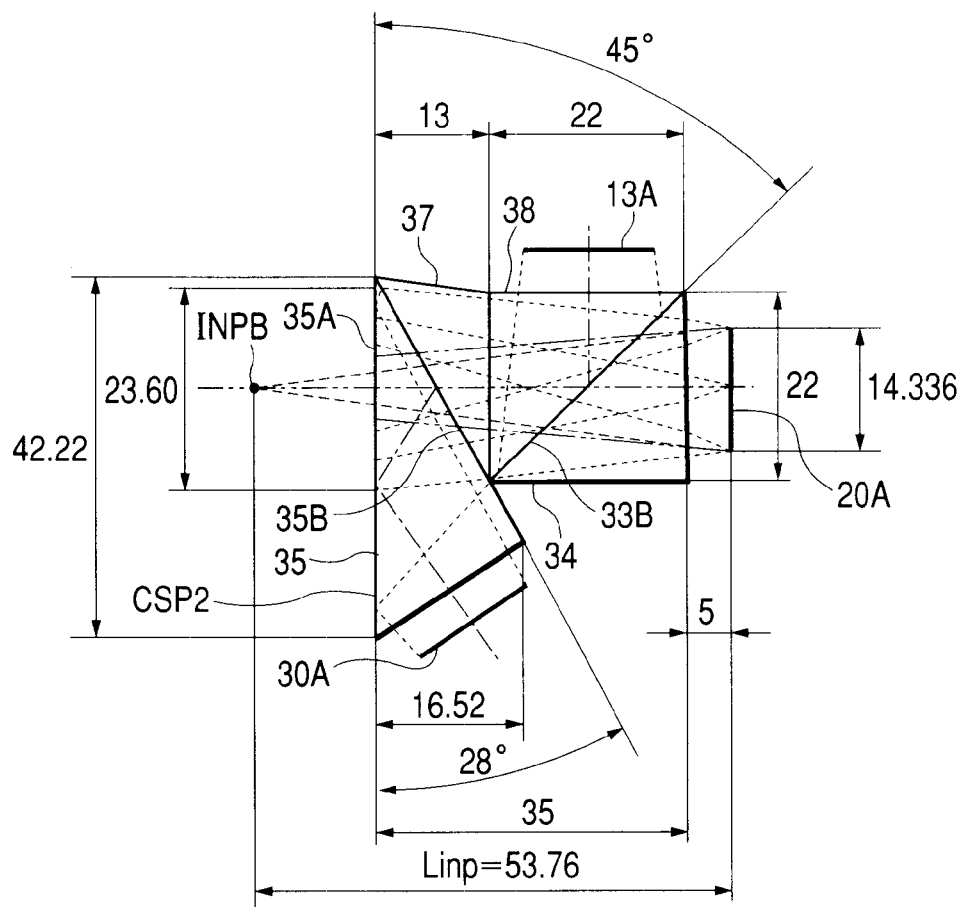
FIG. 9 is a diagram showing a numerical example 2 of a color combining prism corresponding to the second embodiment.
Figure 10:
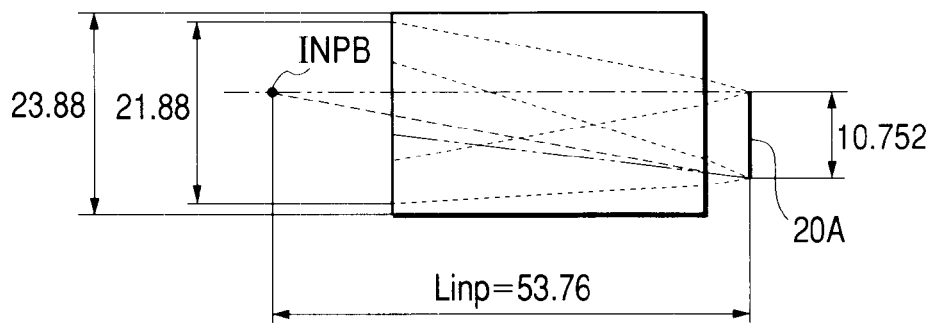
FIG. 10 is another diagram showing the numerical example 2 of the color combining prism corresponding to the second embodiment.

FIG. 9 and FIG. 10 show a numerical example of the color combining prism CSP2 corresponding to the second embodiment. Incidentally, FIG. 9 and FIG. 10 respectively show cross sections in the long side direction of a liquid crystal panel and the short side direction thereof.

In the numerical example, a width (diagonal length) Ldisp across corners of the effective display region of the liquid crystal panel is 17.92 mm, and the f-number of the projection lens 36 is 1.7.

And the position INPB of the entrance pupil of the projection lens 36 is set at a position near to a not shown screen by 53.76 mm (=3.0*Ldisp) as an air-reduced distance Linp from the display surface 20A of the liquid crystal panel.

S-BSL7 (having a refractive index 1.51633 for d-line, and an Abbe number of 64.15) available from Ohara, Inc. is used as the glass material of the color combining prism CSP2.

Moreover, the angle formed by the exit surface 35A of the first A-prism 35 and the dichroic surface 35B reflecting the red color light component is set at 28 degrees.

Moreover, the angle formed by the exit surface 35A of the first A-prism 35 and the dichroic surface 33B reflecting the blue color light component is set at 45 degrees.

In the present example, because the position INPB of the entrance pupil of the projection lens 36 is disposed at a position distant a little from the exit surface 35A of the color combining prism CSP2, the effective diameter of light at the exit surface 35A of the color combining prism CSP2 becomes larger than that of the numerical example 1 a little, but the numerical example 2 is designed to be able to prevent the generation of the eclipse by the division of the prism sandwiched by the dichroic films DM1 and DM2 into the two prisms 37 and 38. Thereby, although the position INPB of the entrance pupil is distant a little from the exit surface 35A, the remarkable miniaturization of the color combining prism CSP2 can be achieved in comparison with the conventional color combining prism similarly to the numerical example 1.

Incidentally, the volume of the color combining prism CSP2 is 23.301 cm$^3$. When the weight of the prism CSP2 is calculated by multiplying the volume of 23.301 cm³ by the specific gravity of S-BSL7 of 2.52, the weight of 58.719 g is obtained. The obtained weight is lighter than that of the conventional cross dichroic prism XDP.

COMPARATIVE EXAMPLE 1

Figure 11:
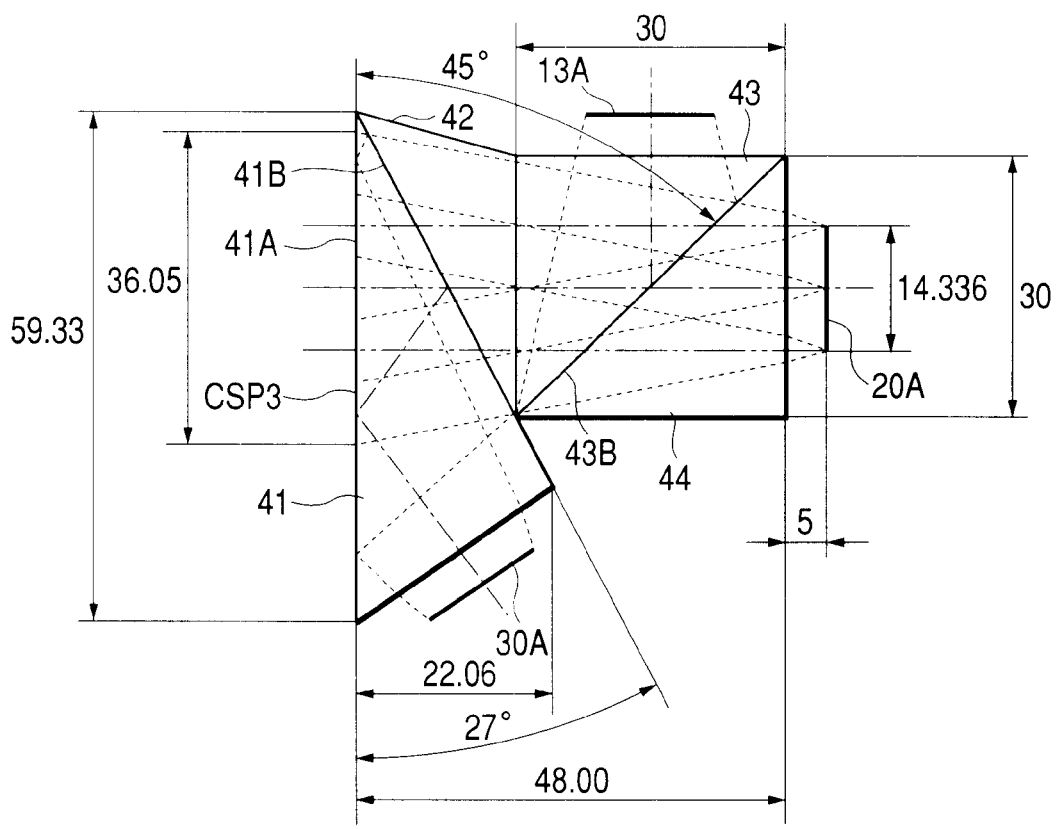
FIG. 11 is a diagram showing an example of a conventional color combining prism.
Figure 12:
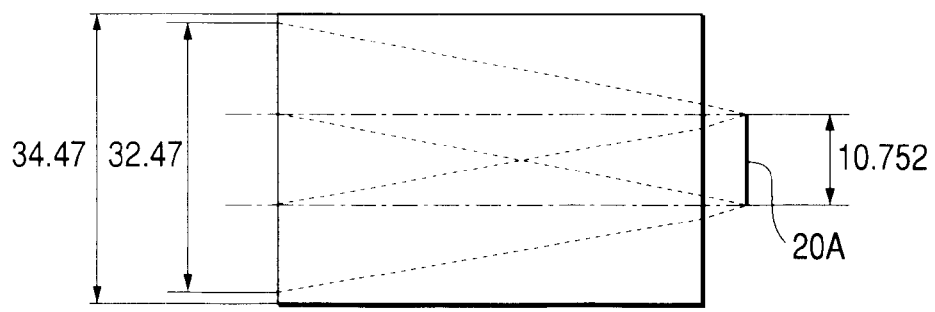
FIG. 12 is another diagram showing the example of the conventional color combining prism.

FIG. 11 and FIG. 12 respectively show cross sections in the long side direction of a liquid crystal panel of a conventional color combining prism CSP3 and the short side direction thereof.

A width (diagonal length) Ldisp across corners of the effective display region of the liquid crystal panel is 17.92 mm, and the f-number of a projection lens is 1.7.

And the position of the entrance pupil of the projection lens is set at an infinite-point in the left side direction in FIG. 11 from the display surface 20A of the liquid crystal panel.

S-BSL7 (having a refraction index 1.51633 for d-line, and an Abbe number of 64.15) available from Ohara, Inc. is used as the glass material of the color combining prism CSP3.

Moreover, the angle formed by an exit surface 41A of a first prism 41 and a dichroic surface 41B reflecting a red color light component is set at 27 degrees. The angle formed by the exit surface 41A of the first prism 41 and a dichroic surface 43B reflecting a blue color light component is set at 45 degrees.

In the comparative example, because the position of the entrance pupil of the projection lens is disposed at a very distant position, the effective diameter of light at the exit surface 41A of the color combining prism CSP3 becomes considerably large to be 36.05 mm in the long side direction and 32.47 mm in the short side direction.

Thereby, the whole size of the color combining prism CSP3 becomes considerably larger than that of the numerical examples 1 and 2.

The volume of the color combining prism CSP3 is 62.887 cm³. When the weight of the prism CSP3 is calculated by multiplying the volume of 62.887 cm³ by the specific gravity of S-BSL7 of 2.52, the weight of 158.475 g is obtained. The obtained weight is 2.54 times as heavy as that of the conventional cross dichroic prism.

It can be understood from the comparative example that a color combining prism becomes rather large in size in the case where the position of the entrance pupil of a projection lens is at an infinite-point in order that dichroic surfaces are not crossed inside of the prism.

COMPARATIVE EXAMPLE 2

Figure 13:
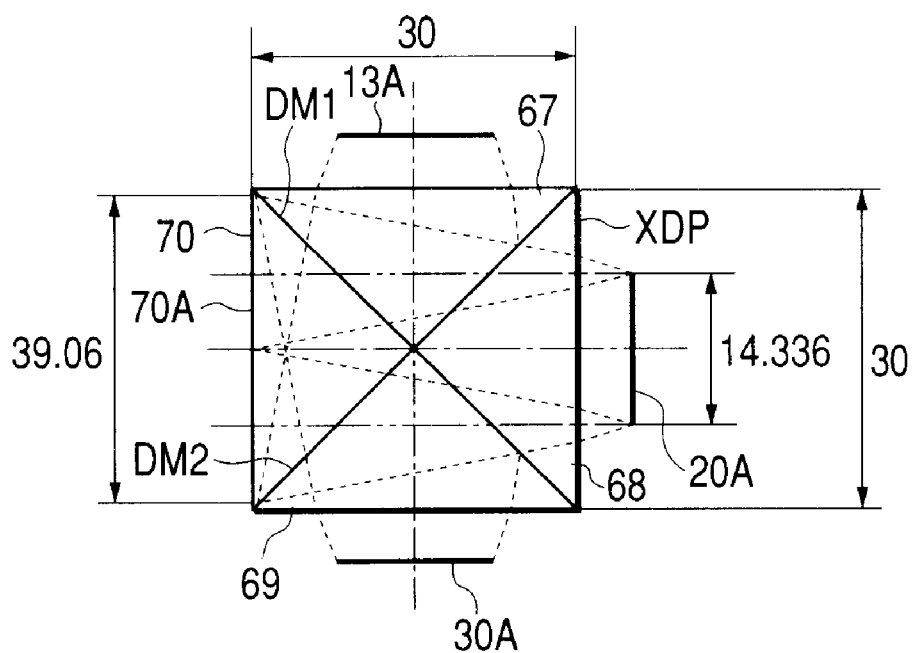
FIG. 13 is a diagram showing an example of another conventional color combining prism.
Figure 14:
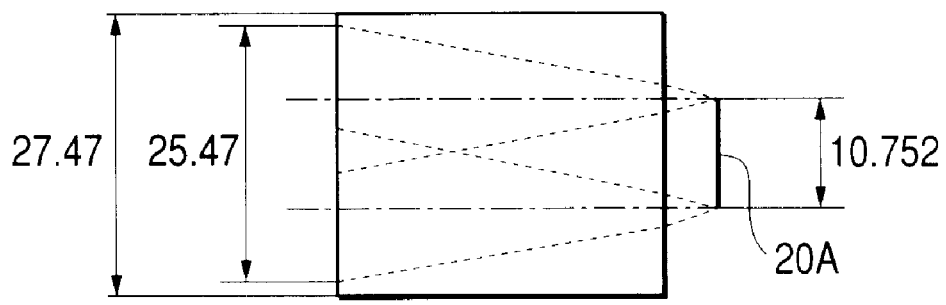
FIG. 14 is another diagram showing the example of the conventional color combining prism.
Figure 15:
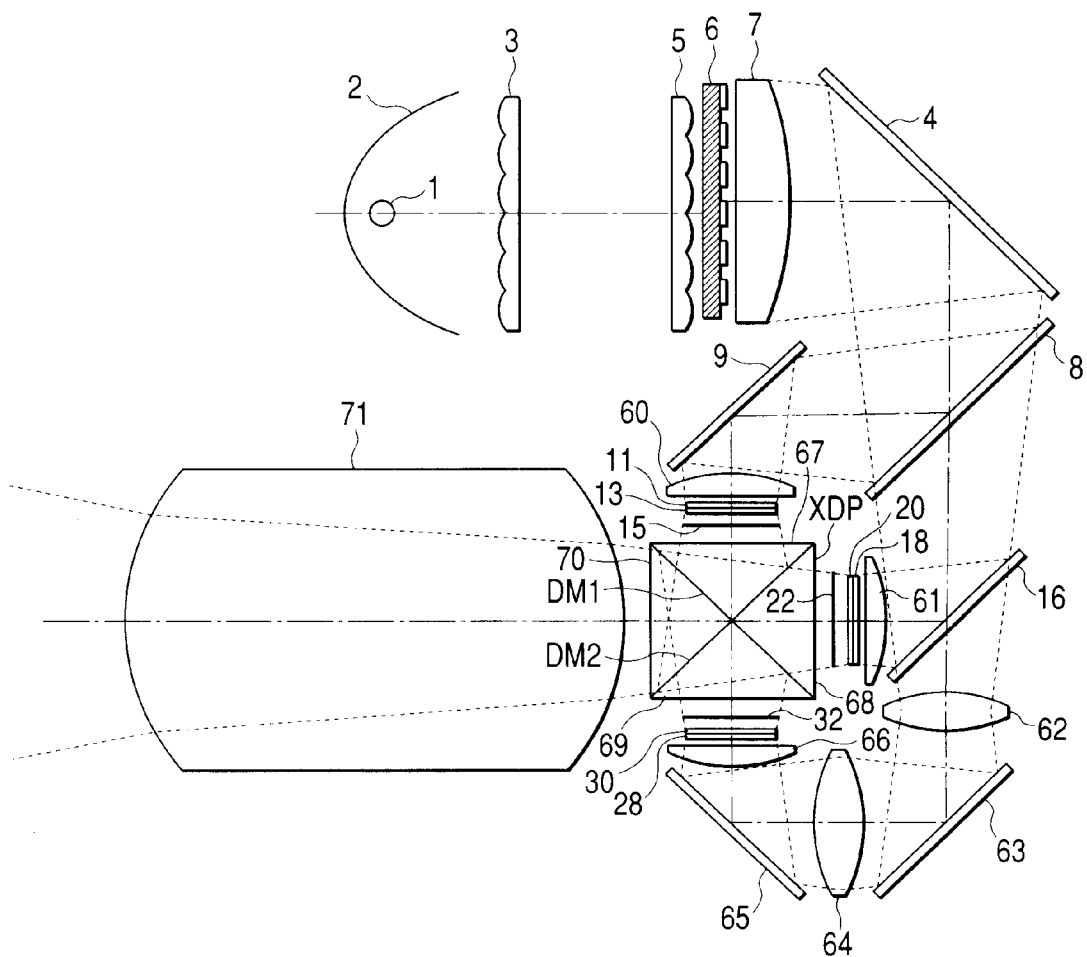
FIG. 15 is an optical cross section of a conventional projection-type image displaying device.

FIG. 13 and FIG. 14 respectively show cross sections of the conventional cross dichroic prism in the long side direction of the liquid crystal panel and the short side direction thereof.

The widths (diagonal length) Ldisp across corners of the effective display region of the liquid crystal panel is 17.92 mm, and the f-number of the projection lens is 1.7.

And the position of the entrance pupil of the projection lens is set at an infinite-point in the left side direction in FIG. 13 from the display surface 20A of the liquid crystal panel.

S-BSL7 (having a refraction index 1.51633 for d-line, and an Abbe number of 64.15) available from Ohara, Inc. is used as the glass material of the cross dichroic prism.

Moreover, the angle formed by an exit surface 70A of a prism 70 and the dichroic surface DM2 reflecting a red color light component is set at 45 degrees. The angle formed by the exit surface 70A of the prism 70 and the dichroic surface DM1 reflecting a blue color light component is also set at 45 degrees.

In the comparative example, too, because the position of the entrance pupil of the projection lens is disposed at a very distant position, light beam emerging from the peripheral portion of the liquid crystal panel is spread. Then, the effective diameter of light at the exit surface 70A of the cross dichroic prism becomes slightly large to be 29.06 mm in the long side direction of the liquid crystal panel and 25.47 mm in the short side direction.

The volume of the cross dichroic prism is 27.47 cm³. When the weight of the prism is calculated by multiplying the volume of 27.47 cm³ by the specific gravity of S-BSL7 of 2.52, the weight of 62.302 g is obtained. The obtained weight is heavier than that of the numerical examples 1 and 2.

Next, conditional expressions of the present invention are described. At first, conditional expressions (1) and (1A) restrict the relation between an air-reduced interval (or distance) between the position of an entrance pupil of a projection optical system such as a projection lens and the display surface of a liquid crystal display element, and the width (diagonal length) across corners of the liquid crystal element.

When the relation between the air-reduced distance and the diagonal length is lower than the lower limit value of the conditional expression (1), the position of the entrance pupil of the projection optical system greatly shifts to the liquid crystal display element side from the incidence surface of the projection optical system. Thereby, the designing of the projection optical system becomes hard. Therefore, such a deviation from the lower limit value is not preferable. Moreover, when the relation between the air-reduced distance and the diagonal length exceeds the upper limit value of the conditional expression (1), the position of the entrance pupil of the projection optical system becomes distant from a color combining optical element. Thereby, the effective diameter of the color combining optical element on the entrance pupil side becomes large. Therefore, such a deviation from the upper limit value is not preferable because the whole size of the color combining optical element becomes large.

Conditional expressions (2) and (2A) restrict the angle θ1 formed by the surface in contact with a dichroic layer (or the dichroic film reflecting a red color light component in the first embodiment and the second embodiment) of the color combining optical element on the exit side thereof and the exit surface of the color combining optical element.

In the region where the angle θ1 is lower than the lower limit value of the conditional expression (2), the angle θ1 does not meet the total reflection condition on the exit surface 35A of the prism 35 that serves both as a transmission surface and a total reflection surface at the nearest position to the exit side. Thereby, eclipses of images are produced, which is not preferable. Moreover, in the region where the angle θ1 exceeds the upper limit value of the conditional expression (2), the effective optical path of the prism 35 on the position nearest to the exit side interferes with the incidence surface 35C of the prism 35. Accordingly, for sake of the prevention of the interference, the prism 35 at the position nearest to the exit side should be made large in size. The increase of the size of the prism 35 results in the increase of the optical path length of the whole color combining element, which is not preferable.

Conditional expressions (3) and (3A) restrict the angle θ2 formed by the exit surface of the color combining optical element and the surface in contact with a dichroic layer (or the dichroic film reflecting a blue color light component in the first embodiment and the second embodiment) of the color combining optical element on the incidence side thereof.

In the region where the angle θ2 is lower than the lower limit value of the conditional expression (3), the incidence surface 33C of the prism 33 shown in FIG. 2 inclines into the counter-clockwise rotation direction. The incidence plane 33C encroaches upon the effective optical path in the prism 33, which is not preferable. And, for the prevention such a situation, it is required to extend the prism 33 toward the light source side, which makes the size of the prism 33 larger. Moreover, in the region where the angle θ2 exceeds the upper limit value of the conditional expression (3), the incidence surface 33C of the prism 33 shown in FIG. 2 inclines into the clockwise rotation direction. Consequently, the liquid crystal panels 13 and 20 shown in FIG. 1 approach to each other to interfere with each other, which is not preferable.

As described above, in the aforesaid first to the third embodiments, the optically anisotropic element such as a phase plate for correcting the optical anisotropy of the liquid crystal display element is disposed between the two polarizing elements disposed at the incidence and exit sides of the liquid crystal display element, respectively, so that the view angle characteristics of the liquid crystal display element can be improved. Besides, the miniaturization of the color combining optical element and the projection optical system can be realized (even if the incidence side of the projection optical system 36 is set to be a non-telecentric system). Consequently, the generation of color unevenness and contrast shading can be suppressed.

Moreover, in the embodiments, since the position of the entrance pupil of the projection optical systems 36 is located near to the exit surface 35A of the color combining optical element within a range meeting the conditional expressions (1) and (1A), the effective diameter of the light beam on the exit surface 35A of the color combining optical element can consequently be made small. Thereby, the miniaturization and the weight saving of the color combining optical element can be achieved.

Incidentally, when the dichroic film is formed as an inclined film whose thicknesses or refractive index changes in a specific direction (or in a slope-like configuration), the generation of the color unevenness and the contrast shading can be suppressed to be smaller.

Moreover, in the color combining optical element, when the two dichroic films which reflect light having wavelength ranges different from each other are disposed inside of the color combining optical element films and when the two dichroic films are disposed not to cross with each other, the manufacturing of the color combining optical element becomes easy, and the manufacturing costs can also be reduced.

Moreover, when the angle θ1 formed by the exit surface of the prism placed at the position nearest to the projection optical system side in the color combining optical element and the surface in contact with the dichroic film is set to meet the conditional expressions (2) and (2A), the optical path length in the color combining optical element can be shortened, and further the production of ghosts owing to reflection on the dichroic film can be suppressed. Moreover, the total reflection condition on the exit surface of the prism placed at the position nearest to the projection optical system side can be satisfied.

Moreover, when the angle θ2 formed by the exit surface of the prism placed at the position nearest to the projection optical system side in the color combining optical element and the surface in contact with the dichroic film formed between the two prisms other than the prism placed nearest to the projection optical system side is set to meet the conditional expressions (3) and (3A), the optical path length in the color combining optical element can be shortened. And, not only the color combining optical element itself can be miniaturized, but also the back focal distance of the projection optical system can be shortened. Consequently, the miniaturization and the heightening of the performance of the projection optical system can be achieved.

Moreover, when the distance between the optical axes of the lenses of the microlens array is set to be larger than the pixel aperture distance of the liquid crystal display element in the case where the microlens array corresponding to the pixels of the liquid crystal display element is disposed on the incidence side of the liquid crystal display element the eclipse of illumination light illuminating the peripheral portion of the liquid crystal display element can be decreased.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A projection-type image displaying device comprising:
   at least one image display element for modulating light from a light source; and
   a projection optical system for projecting light from said at least one image display element;
   wherein an air-reduced distance Linp between an entrance pupil of said projection optical system and a display surface of said image display element and a diagonal length Ldisp across corners of the display surface of said image display element meet the following condition:

$$1.5 < Linp/Ldisp < 4.$$

2. A device according to claim 1, wherein said air-reduced distance Linp and said diagonal length Ldisp meet the following condition:

$$1.9 < Linp/Ldisp < 3.5.$$

3. A device according to claim 1, wherein an incidence side of said projection optical system is configured as a non-telecentric system.

4. A device according to claim 1, wherein said image display element is a liquid crystal element.

5. A device according to claim 1, said device further comprising:
   polarizing elements disposed on an incidence side and exit side of said at least one image display element; and
   at least one optically anisotropic element disposed between said polarizing elements disposed on the incidence side and the exit side on an optical path on which said at least one image display element is disposed.

6. A device according to claim 1,
   wherein said at least one image display element is a plurality of image display elements for respectively modulating a plurality of light rays having wavelength ranges different from each other; and
   said device further comprises a color combining optical element for combining the light rays modulated by said plural image display elements, said color combining optical element including two dichroic films therein, said dichroic films not being crossed with each other in an inside of said color combining optical element.

7. A device according to claim 6, wherein at least one of said two dichroic films is formed with an inclined films whose thickness or refractive index changes in a specific direction.

8. A device according to claim 6,
wherein said color combining optical element includes at least three prisms, and an exit surface of a prism nearest to said projection optical system among said three prisms reflects light that has entered from an incidence surface of the prism nearest to said projection optical system toward one of said two dichroic films, and surface light that has entered from the side of said one of the dichroic films emerges from said exit surface.

9. A device according to claim 8, wherein an angle θ1 formed by said exit surface of said prism nearest to said projection optical system in said color combining optical element and a surface of said prism which is in contact with the dichroic film, meets the following condition:

20 degrees<θ1<35 degrees.

10. A device according to claim 9, wherein said angle θ1 meets the following condition:

23 degrees<θ1<32 degrees.

11. A device according to claim 8, wherein an angle θ2 formed by said exit surface of said prism nearest to said projection optical system in said color combining optical element and the dichroic film which is not in contact with said prism nearest to said projection optical system, meets the following condition:

40 degrees<θ2<50 degrees.

12. A device according to claim 11, wherein said angle θ2 meets the following condition:

42 degrees<θ2<48 degrees.

13. A device according to claim 6,
wherein said color combining optical element includes at least four prisms, two of which are disposed between said two dichroic films; and an exit surface of a prism nearest to said projection optical system among said four prisms reflects light that has entered from an incidence surface of the prism nearest to said projection optical system toward one of said two dichroic films, and light that has entered from the side of said one of the dichroic films emerges from said exit surface.

14. A device according to claim 13, wherein an angle θ1 formed by said exit surface of said prism nearest to said projection optical system in said color combining optical element and a surface of said prism which is in contact with the dichroic film meets the following condition:

20 degrees<θ1<35 degrees.

15. A device according to claim 14, wherein said angle θ1 meets the following condition:

23 degrees<θ1<32 degrees.

16. A device according to claim 13, wherein an angle θ2 formed by said exit surface of said prism nearest to said projection optical system in said color combining optical element and the dichroic film which is not in contact with said prism nearest to said projection optical system, meets the following condition:

40 degrees<θ2<50 degrees.

17. A device according to claim 16, wherein said angle θ2 meets the following condition:

42 degrees<θ2<48 degrees.

18. A device according to claim 1, said device further comprising a microlens array having lenses corresponding to respective pixels of said image display element, said microlens array being disposed on an incidence side of said image display element, wherein a distance between optical axes of the lenses of said microlens array are larger than a distance between pixel apertures of said image display element.

19. An image display system comprising:
said projection-type image displaying device according to claim 1; and
an image information supplying device for supplying image information to be projected and displayed by said projection-type image displaying device.

20. A projection-type image displaying device comprising:
a plurality of liquid crystal display elements for modulating a plurality of light rays having wavelength regions different from each other respectively;
a color combining optical element for combining the light rays modulated by said plural liquid crystal display elements;
a projection optical system for projecting a light ray combined by said color combining optical element;
polarizing elements disposed on an incidence side and an exit side of each of said plural liquid crystal display elements; and
at least one optically anisotropic element disposed between said polarizing elements on the incidence side and the exit side of each of said liquid crystal elements in an optical path of at least one light ray among said plural light rays;
wherein a light incidence side of said projection optical system is configured to be a non-telecentric system and an air-reduced distance Linp between an entrance pupil of said projection optical system and display surface of said liquid crystal display element and diagonal length Ldisp across corners of the display surface of said liquid crystal display element meet the following condition:

1.5<Linp/Ldisp<4.

21. A device according to claim 20, wherein said air-reduced distance Linp and said diagonal length Ldisp meet the following condition:

1.9<Linp/Ldisp<3.5.

22. A device according to claim 20, said device further comprising a microlens array having lenses corresponding to respective pixels of said liquid crystal display element, said microlens array being disposed on the incidence side of said liquid crystal display element, wherein a distance between optical axes of the lenses of said microlens array is larger than a distance between pixel apertures of said liquid crystal display element.

23. An image display system comprising:
said projection-type image displaying device according to claim 20; and
an image information supplying device for supplying image information to be projected and displayed by said projection-type image displaying device.

* * * * *